(12) United States Patent
Morris

(10) Patent No.: US 8,381,136 B2
(45) Date of Patent: Feb. 19, 2013

(54) HANDHELD ELECTRONIC DEVICE SUPPORTING MULTIPLE DISPLAY MECHANISMS

(75) Inventor: Robert P. Morris, Raleigh, NC (US)

(73) Assignee: Scenera Technologies, LLC, Portsmouth, NH (US)

(*) Notice: Subject to any disclaimer, the term of this patent is extended or adjusted under 35 U.S.C. 154(b) by 2227 days.

(21) Appl. No.: 10/853,830

(22) Filed: May 24, 2004

(65) Prior Publication Data

US 2005/0259032 A1 Nov. 24, 2005

(51) Int. Cl.
*G06F 3/00* (2006.01)
*G06F 9/00* (2006.01)
*G06F 17/00* (2006.01)

(52) U.S. Cl. ........ 715/864; 715/730; 715/731; 715/830; 715/807; 715/806

(58) Field of Classification Search .................. 715/807, 715/743, 742, 741, 751, 781, 805, 804, 806, 715/731, 730, 864
See application file for complete search history.

(56) References Cited

U.S. PATENT DOCUMENTS

| | | | |
|---|---|---|---|
| 5,307,055 A * | 4/1994 | Baskin et al. | 345/2.2 |
| 5,606,344 A * | 2/1997 | Blaskey et al. | 715/500.1 |
| 5,745,909 A * | 4/1998 | Perlman et al. | 715/203 |
| 6,546,337 B2 * | 4/2003 | Fish et al. | 701/213 |
| 6,637,896 B2 | 10/2003 | Li et al. | 353/119 |
| 7,021,771 B2 * | 4/2006 | Dwyer et al. | 353/79 |
| 2005/0259032 A1 * | 11/2005 | Morris | 345/1.1 |

* cited by examiner

*Primary Examiner* — Boris Pesin
*Assistant Examiner* — Sabrina Greene

(57) ABSTRACT

A method for independently supporting at least two display mechanisms in a handheld electronic device and a handheld electronic device implementing the method includes a primary display window, a secondary display window and a display manager coupled to the primary and secondary display windows. According to the present invention, the display manager allows the primary display window to display a first set of objects and allows the secondary display window to display a second set of objects independently, whereby the first set and second set of objects include at least one common object.

32 Claims, 8 Drawing Sheets

HANDHELD ELECTRONIC DEVICE SUPPORTING MULTIPLE DISPLAY MECHANISMS

FIELD OF THE INVENTION

The present invention relates to handheld electronic devices, and more particularly, to a handheld electronic device that independently supports multiple display mechanisms.

BACKGROUND OF THE INVENTION

Handheld electronic devices, such as mobile phones, PDAs and digital cameras, typically include one display mechanism, such as an LCD or display window. The display mechanism can display files stored in the device, e.g., captured images, or a user interface, or other features, e.g., games, information, etc. The size of the display window is limited by the size of the device. Thus, as the size of a device gets smaller and smaller, so must the size of the display mechanism also get smaller.

Presently, the display window on handheld devices allow only one or two viewers to see the displayed contents comfortably. If more people wish to see, the display window must be placed farther from the viewers, which then makes it difficult, if not impossible, for each viewer to read words or to see details that are small.

Some handheld devices can be coupled via cables to a secondary display window that is external to the device, e.g., a television or projection system, such that the device transmits signals directly to the secondary display for group viewing. Many digital cameras support this feature. Other handheld devices include an integrated projection system, as described in U.S. Pat. No. 6,637,896, entitled "Compact Projection System and Associated Device," issued to Li et al. on Oct. 28, 2003. In such a system, the device's projection system projects content onto a suitable surface, e.g., a flat wall or projection screen.

With each of the above described display mechanisms, the content displayed on the secondary display window mirrors that displayed on a primary display window, e.g., the LCD, on the device. Thus, if a user is displaying a presentation, the primary and secondary display windows include the content of the presentation, as well as control buttons and/or icons used by the presenter to manage the presentation. The user cannot control the content displayed on either the primary or secondary display mechanisms.

Accordingly, what is needed is an improved display mechanism for a handheld electronic device. The present invention addresses such a need.

SUMMARY OF THE INVENTION

The present invention provides a method for independently supporting at least two display mechanisms in a handheld electronic device and a handheld electronic device implementing the method. According to the present invention, the handheld electronic device includes a primary display window, a secondary display window and a display manager coupled to the primary and secondary display windows. The display manager allows the primary display window to display a first set of objects and allows the secondary display window to display a second set of objects independently, whereby the first set and second set of objects include at least one common object.

According to the method and device disclosed herein, the present invention allows a user of the device or an application running in the device to control displayed content on each of the supported display mechanisms. The multiple display mechanisms can display the same information, completely different information, or different information with a shared subset of information shown on all display mechanisms. In this manner, at least one display mechanism can be used for controlling a presentation and the remaining display mechanisms can be used for displaying the presentation.

DETAILED DESCRIPTION OF THE INVENTION

The present invention relates to handheld electronic devices, and more particularly, to a handheld electronic device that supports multiple display mechanisms independently. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

According to a preferred embodiment of the present invention, the handheld electronic device includes at least two display mechanisms, a primary display window and one or more secondary display windows. The device also includes a plurality of display buffers that store information to be displayed on the primary display window or the secondary display window(s) or both primary and secondary display windows. A user or application controls what content is written to the display buffers and therefore determines what is displayed on each display mechanism. So, for instance, the primary display window can be used for allowing the user to control a presentation and the secondary display windows can be used for displaying the presentation to an audience.

Figure 1:
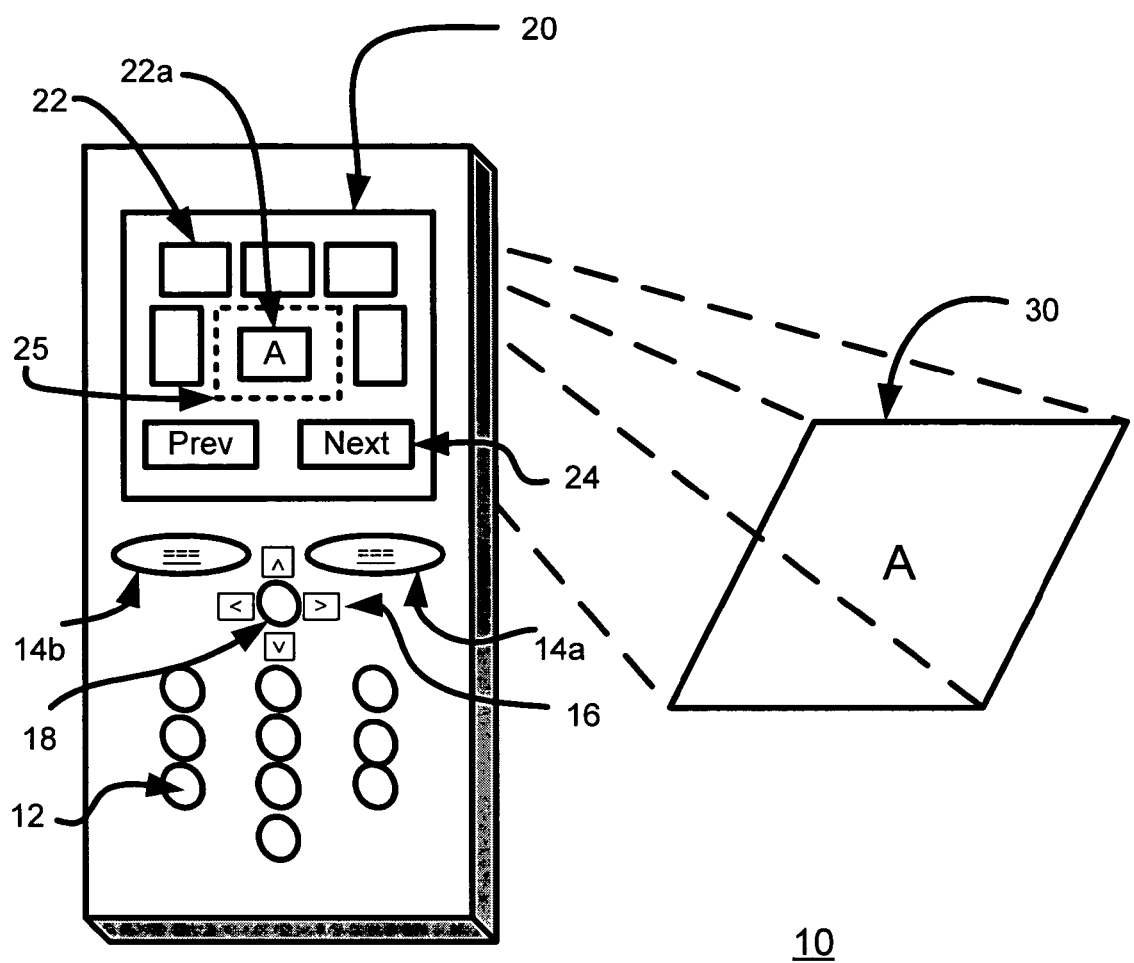
FIG. 1 is a handheld electronic device in which the preferred embodiment of the present invention is implemented.

FIG. 1 is an exemplary handheld electronic device that implements the preferred embodiment of the present invention. The device 10 is a typical mobile phone that includes standard character keys 12, right-click 14a and left-click 14b menu buttons, navigation buttons 16, and a select button 18.

The device 10 also includes a primary display mechanism 20, e.g., LCD, and a secondary display mechanism 30. In a preferred embodiment, the secondary display mechanism 30 is a projection system that projects images or information onto a suitably flat surface, such as a projection screen or wall. Those skilled in the art readily appreciate that the secondary display mechanism 30 need not be limited to a projection system but can also be any other type of external display or screen coupled to the handheld electronic device, such as a television or computer monitor. Moreover, the handheld electronic device 10 can support more than one secondary display mechanism although FIG. 1 depicts only one.

In the example shown in FIG. 1, a software application running in the device 10 is a photo album viewing application, which causes a plurality of images 22 to be displayed to the user on the primary display window 20. The primary display window also displays control buttons 24 and a selection window 25, which in this case, allow the user to navigate between the images 22.

In conventional devices, if the device was enabled to support a secondary display window, the content displayed therein would be the same as that displayed on the primary display. That is, the images 22 and the control buttons 24 and selection window 25 would be displayed on the secondary display. Such a display is not necessarily desirable, particularly if an audience is viewing the secondary display.

According to the present invention, the device 10 supports multiple display mechanisms independently. Thus, the content displayed on the secondary display window 30 can be different from that displayed on the primary display window 20. As is shown in FIG. 1, image A (22a) is displayed on the secondary display window 30, while the plurality of images 22, including image A (22a), control buttons 24 and selection window 25 are displayed on the primary display window 20. By supporting independent primary 20 and secondary 30 display windows, the device 10 provides greater flexibility and functionality for the user as well as for viewers.

Figure 2:
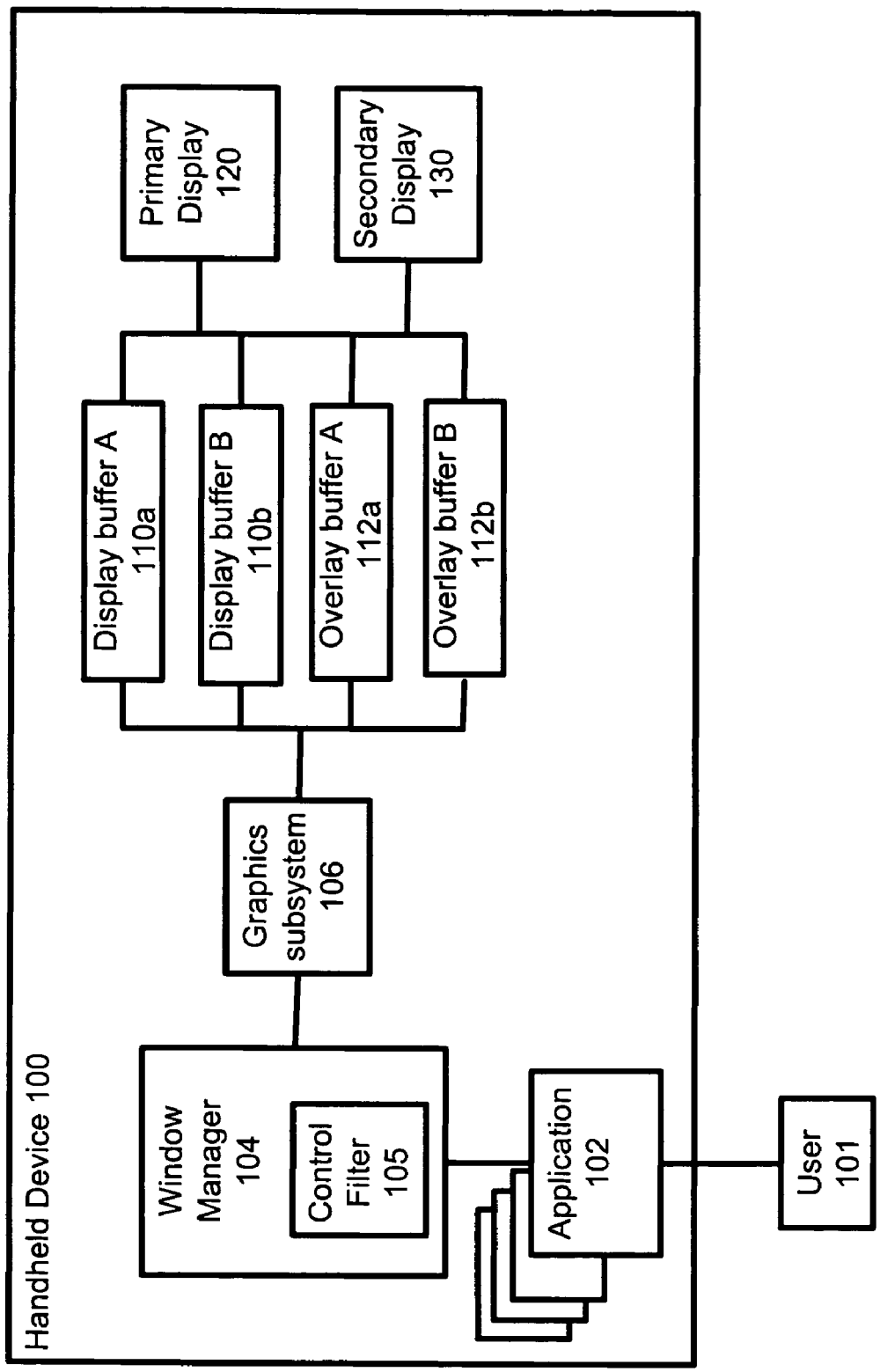
FIG. 2 is a block diagram of the handheld electronic device according to a preferred embodiment of the present invention.

FIG. 2 is a block diagram of the handheld electronic device 100 according to the preferred embodiment of the present invention. The device 100 includes a plurality of software applications 102, a display manager 104, a graphics subsystem 106, a plurality of buffers 110a, 110b, 112a, 112b, and a primary display window 120 and a secondary display window 130. Each of the plurality of software applications 102 provide an interface between a user 101 and the device 100, and provides instructions to the display manager 104 pertaining to what objects should be displayed on the primary 120 and secondary 130 display windows. The instructions from the application 102 may be in response to the user's 101 input or they may be generated by the application itself 102.

According to the preferred embodiment of the present invention, the display manager 104 receives the instructions and objects from the application 102, and controls how the objects are displayed on the primary 120 and secondary 130 display windows. The plurality of buffers includes a plurality of display buffers 110a, 110b. The display manager 104 utilizes the graphics subsystem 106 to associate the primary 120 and secondary 130 display windows with at least one of the display buffers 110a, 110b. The graphics subsystem 106 is also utilized to write or draw objects to the display buffer(s) 110a, 110b associated with the primary 120 and secondary 130 displays. The objects in the display buffer(s) 110a, 110b are then displayed on the associated primary 120 and secondary 130 display windows.

In the preferred embodiment of the present invention, the display manager 104 operates in at least two modes: mirror and independent. In the mirror mode, a set of objects displayed on the secondary display window(s) 130 mirror those displayed on the primary display window 120, i.e., the objects displayed are identical. In the independent mode, the set of objects displayed on the secondary display window(s) 130 are not identical to those displayed on the primary display window 120. In this mode, the primary 120 and secondary 130 display windows can display some common objects, or the displayed objects can be completely distinct from one another.

Figure 3A:
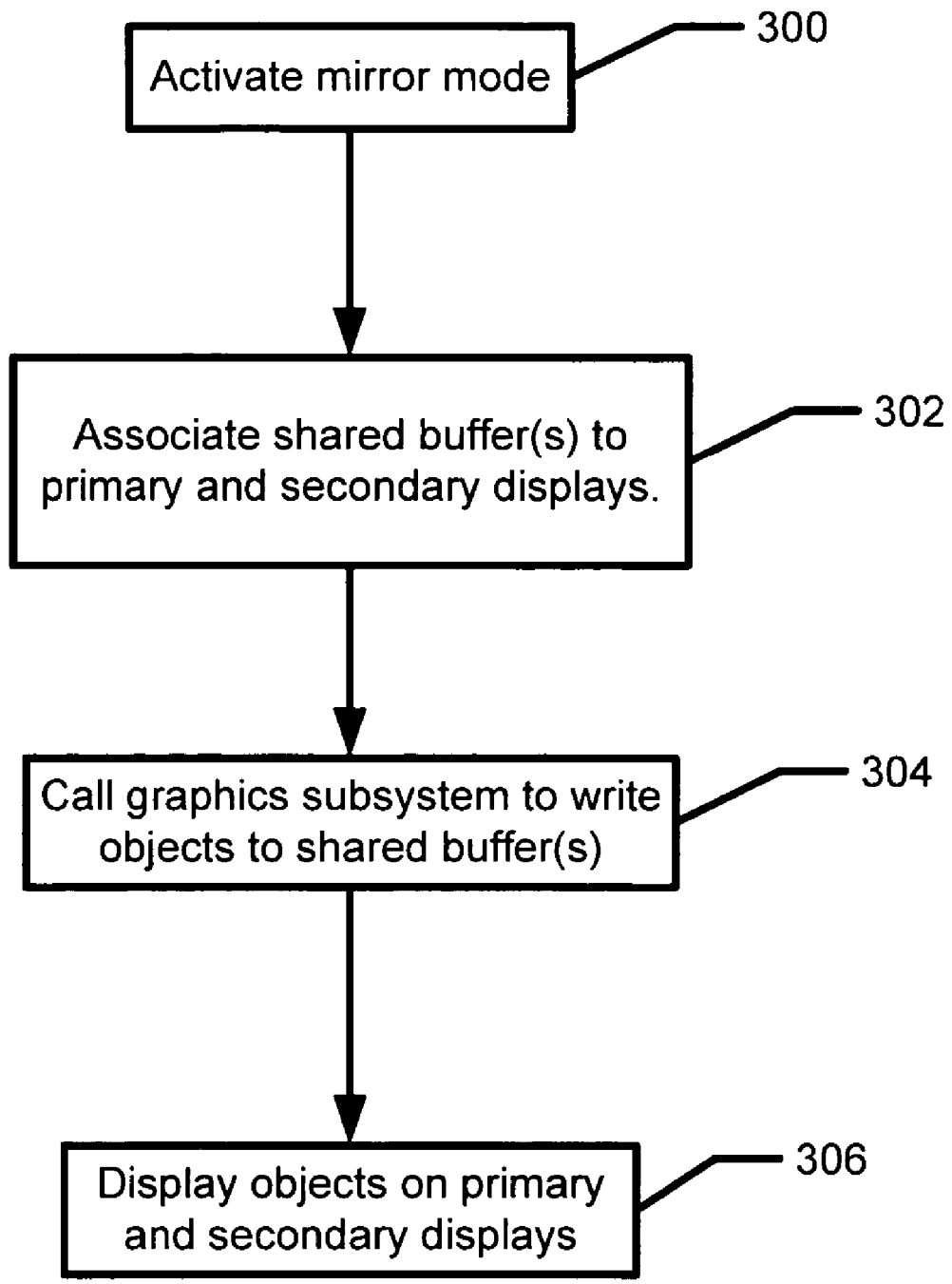
FIG. 3A is a flowchart illustrating a process for implementing the mirror mode according to a preferred embodiment of the present invention.

FIG. 3A is a flowchart illustrating a process for implementing the mirror mode according to a preferred embodiment of the present invention. Referring to FIGS. 2 and 3A together, the process begins by activating the mirror mode in the display manager (step 300). The activation can either be initiated by the user 101, via the application 102, or it can be initiated by the application 102 itself.

Once the mirror mode is set, the display manager 104 calls the graphics subsystem 106 to associate at least one display buffer, e.g., 110a, with both the primary 120 and secondary 130 displays (step 302). The at least one display buffer 110a is shared by the primary 120 and secondary 130 displays. Once the displays 120, 130 are associated with the buffer 110a, the display manager 104 calls the graphics subsystem to write a set of objects to the shared buffer 110a (step 304).

Figure 3B:
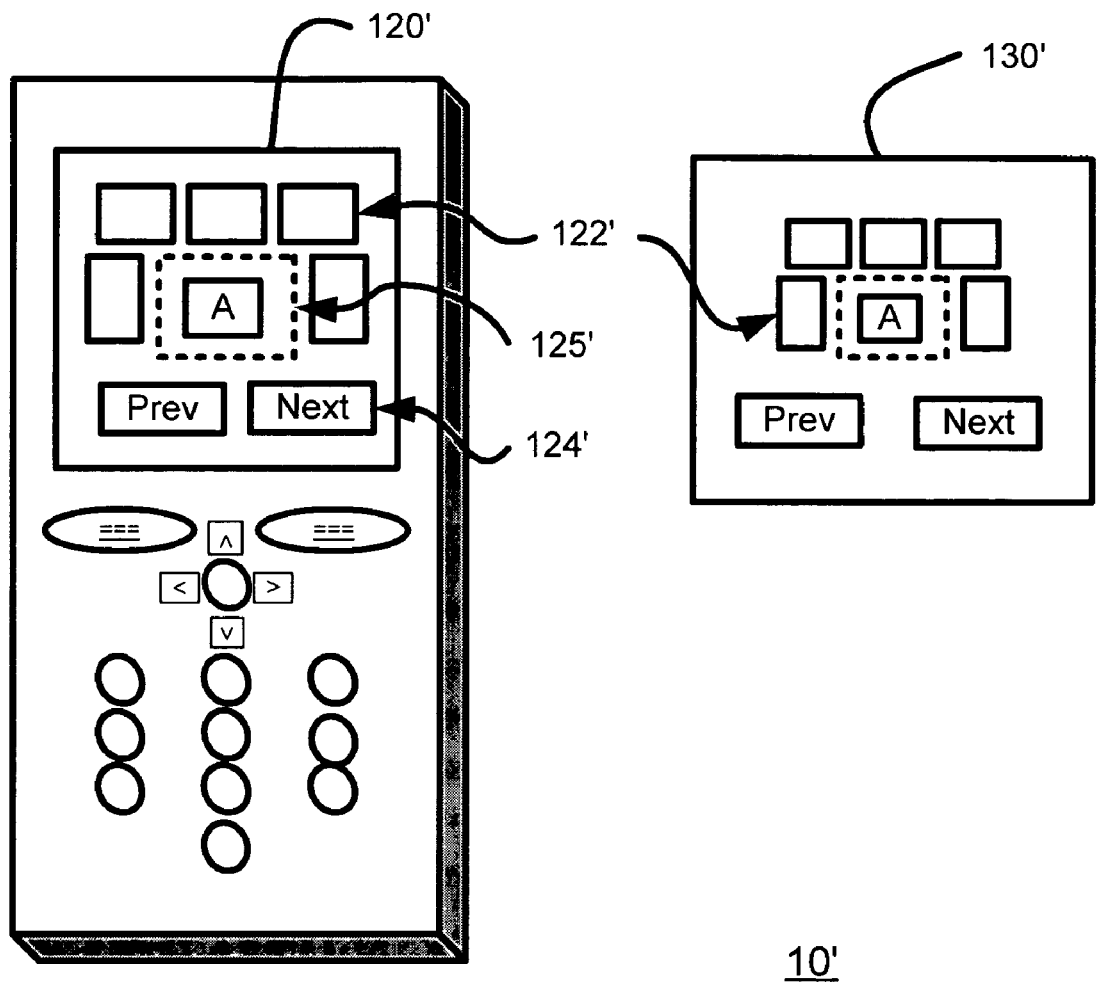
FIG. 3B illustrates the resulting primary and secondary displays when the mirror mode is activated.

After the set of objects have been written into the shared buffer 110a, the primary 120 and secondary 130 display windows display the set of objects when the windows are activated or refreshed (step 306). FIG. 3B illustrates the resulting primary 120' and secondary 130' display windows when the mirror mode is activated. As is shown, the secondary display window 130' displays all of the images 122' as well as control buttons 124' and selection window 125'displayed in the primary display window 120.'

In a preferred embodiment, double buffering is implemented to improve performance. In double buffering, the set of objects is drawn to an off screen buffer that is not active. After the set of objects has been drawn, the display manager 104 activates the off screen buffer to display the set of objects. Double buffering is well known in the art, and further elaboration is unnecessary.

Because the primary 120 and secondary 130 display windows share the same display buffer 110a, they necessarily display the same objects; hence the mirror effect. All subsequent calls from the display manager 104 to the graphics subsystem 106 affect the primary 120 and secondary 130 display windows.

Figure 4:
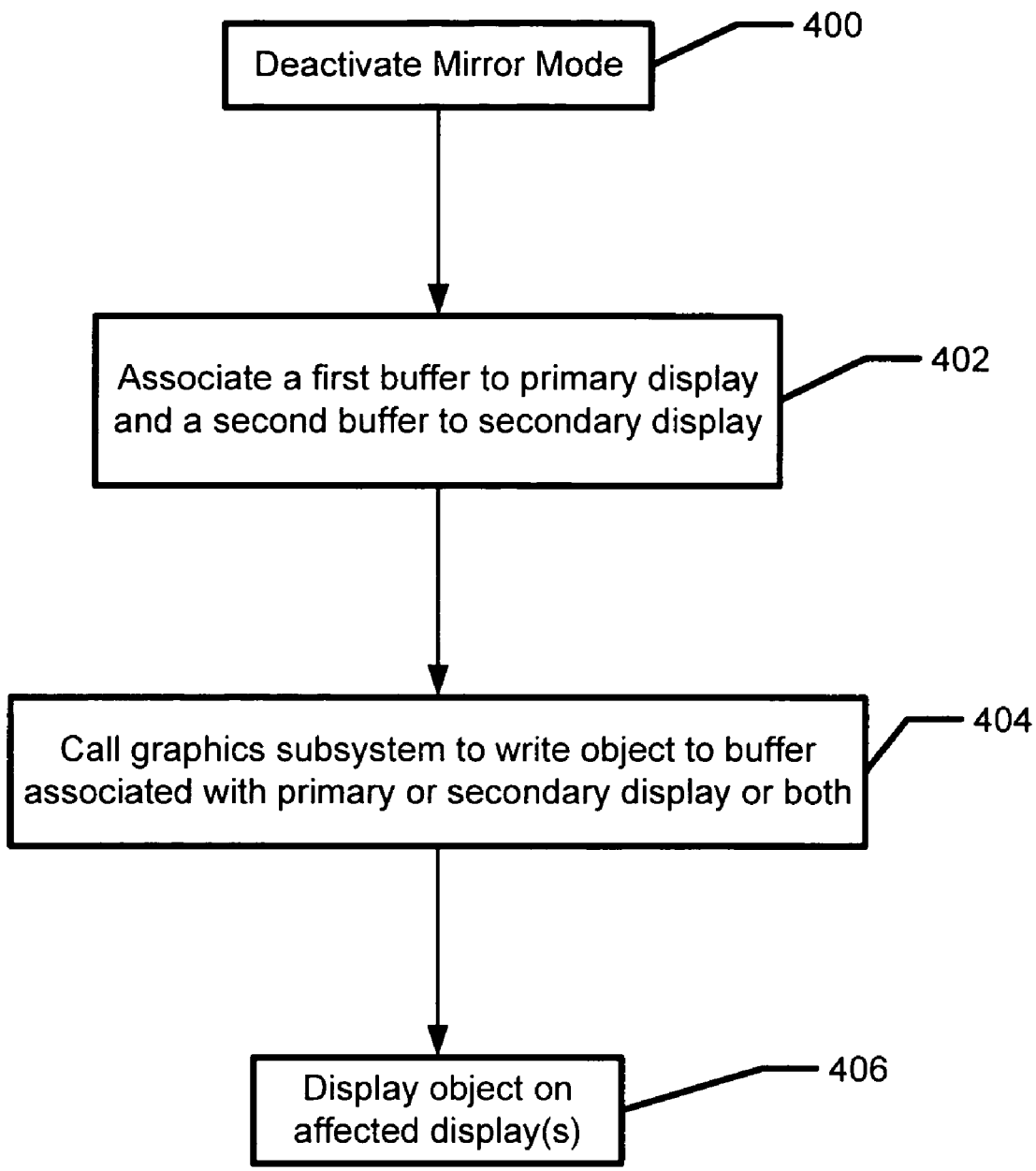
FIG. 4 is a flowchart illustrating a process for implementing the independent mode according to a preferred embodiment of the present invention.

FIG. 4 is a flowchart illustrating a process for implementing the independent mode according to a preferred embodiment of the present invention. Referring to FIG. 2 and FIG. 4, the process begins by de-activating the mirror mode (step 400). As before, the de-activation can either be initiated by the user 101, via the application 102, or it can be initiated by the application 102 itself. As those skilled in the art readily appreciate, such a de-activation step can be omitted if the default setting in the display manager 104 is the independent mode. The default setting is not limited to any one setting and can be determined by the user 101 or by the display manager 104.

Once the mirror mode is deactivated, the display manager 104 calls the graphics subsystem 106 to associate different display buffers 110a, 110b to the primary 120 and secondary 130 display windows. Thus, for example, a first display buffer (or buffers), e.g., 110a, is associated with the primary display window 120 and a second display buffer(s), e.g., 110b, is associated with the secondary display window 130 (step 402). Once the display windows 120, 130 are associated with their respective buffers 110a, 110b, the display manager 104 calls the graphics subsystem to write or draw a set of objects to either the first display buffer 110 *a*, or second display buffer 110*b*, or both (step 404). After the set of objects has been written into the designated buffer(s) 110*a* or 110*b* or both, the set of objects is displayed on the affected display window(s), e.g., the primary 120 or secondary 130 or both display windows (step 406) when the affected display window(s) is activated or refreshed.

FIG. 1 is an example of the resulting primary 20 and secondary 30 display windows when the mirror mode is de-activated. As is shown, the primary display window 20 displays the array of images 22 as well as control buttons 24 and selection window 25, while the secondary display window 30 displays only the selected image 22*a*. In this example, the display manager 104 has drawn a set of objects corresponding to image A (22*a*) to the buffer, e.g., 110*b*, associated with the secondary display 130.

Because the primary 120 and secondary 130 display windows do not share the same display buffer, i.e., they are associated with different buffers 110*a*, 110*b*, they do not necessarily display the same set of objects. All subsequent calls from the display manager 104 to the graphics subsystem 106 affect either the primary display window 120 or the secondary display window 130 or both.

Referring again to FIG. 2, the display manager 104 also includes a plurality of control functions that, when called, draw standard control icons and menu items, e.g., a window frame, dialog box, scroll list, navigation buttons, etc, to a buffer. In some cases, it is desirable to display certain control icon/menu items on the primary display window 120 only, and not on the secondary display window 130. One way to achieve this outcome is to provide explicit instructions in the application 102 directing the display manager 104 to write one set of objects including the control icon/menu items to the display buffer, e.g., 110*a*, associated with the primary display window 120, and to write another set of objects excluding the control icon/menu items to the buffer, e.g., 110*b*, associated with the secondary display window 130. This, however, requires additional coding in the application, which is time consuming, tedious and inefficient.

To avoid such inefficiency, the preferred embodiment of the present invention provides at least one preconfigured control filter 105 in the display manager 104. In a preferred embodiment, a control filter 105 is associated with a filter criteria that defines an object, e.g., control icon/menu items, and at least one affected display. Control filters can be configured to filter other types of objects. The filter criteria can be preconfigured by the display manager 104 or user-defined.

When a control filter 105 is activated, the control filter 105 analyzes each object in a set of objects to be drawn and, if the object matches its filter criteria, draws the object to a buffer associated with the at least one affected display, i.e., either the primary 120 or secondary 130 display window. For example, if the filter criteria for the control filter 105 filters objects that are control icon/menu items and the affected display is the primary display window 120, the buffer will be associated with the primary display window 120. In this manner, matched objects, e.g., control buttons and selection windows, are displayed on the primary display window 120, but will not be displayed on the secondary display window 130.

In a preferred embodiment, the buffer to which the control filter 105 draws matching objects is referred to as an overlay buffer 112*a*, 112*b*, which is distinct from the display buffers 110*a*, 110*b*. Accordingly, the display manager 104 can operate in the mirror mode with active filters simultaneously. Moreover, filters can also operate in the independent mode. For example, a filter can be used as a substitute for a shared buffer in the independent mode.

Figure 5A:
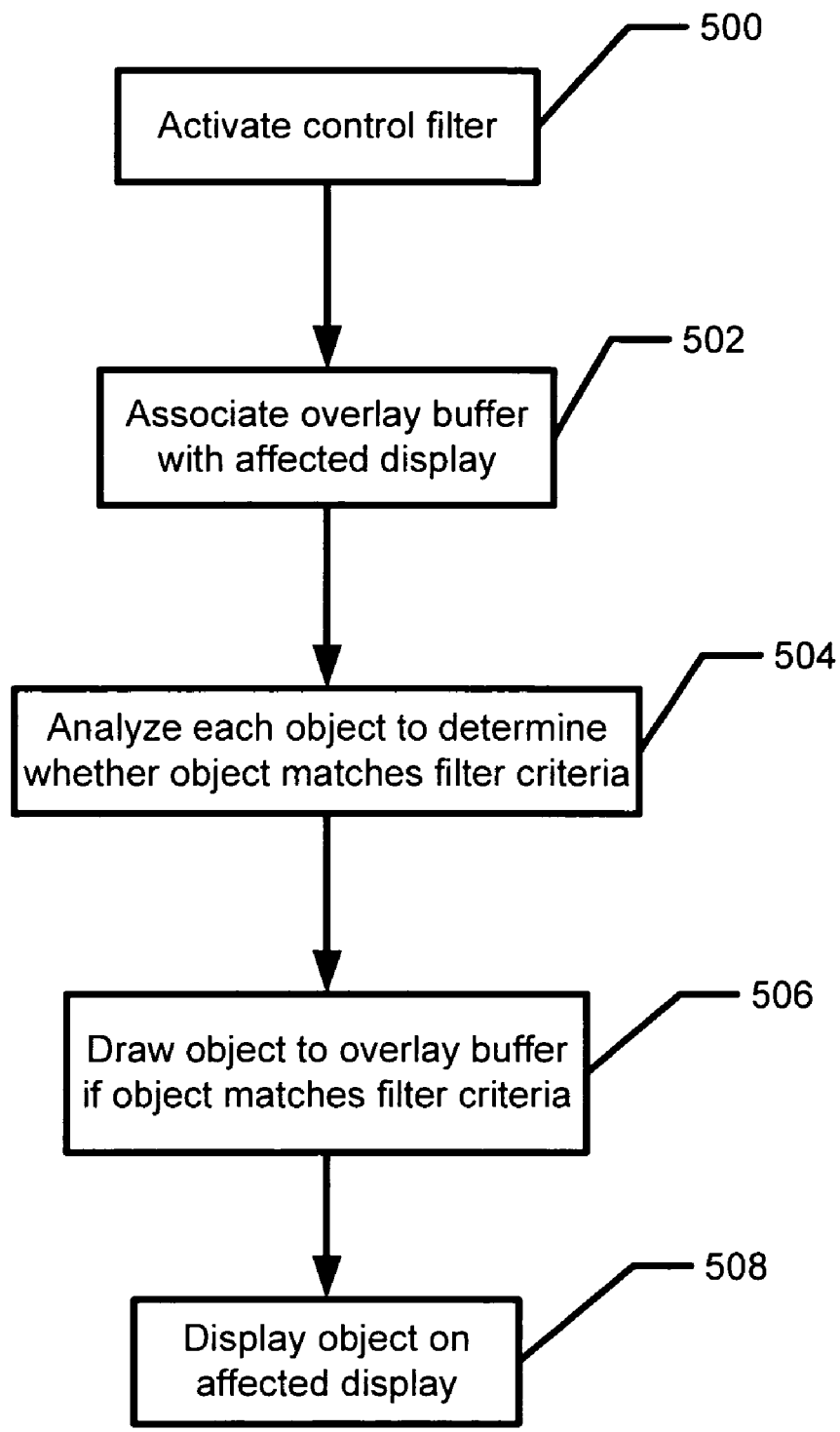
FIG. 5A is a flowchart illustrating a process for implementing a filter according to a preferred embodiment of the present invention.

FIG. 5A is a flowchart illustrating a process for implementing a filter according to a preferred embodiment of the present invention. Referring to FIGS. 2 and 5A, the process begins by activating a control filter 105 in the display manager 104 (step 500). The display manager 104 then calls the graphics subsystem 106 to associate an overlay buffer, e.g., 112*a*, with either the primary 120 or secondary 130 display window or both (step 502) depending on which display window(s) is affected by the activated control filter 105.

Once the control filter 105 is activated and the overlay buffer 112*a* is associated with the affected display window, e.g., 120, the control filter 105 analyzes each object in a set of objects passed from the application 102 to determine whether the object matches the filter criteria (step 504). The filter 105 writes the object to the overlay buffer 112*a* if the object matches the filter criteria (step 506), and the object is displayed on the affected display window (step 508).

Figure 5B:
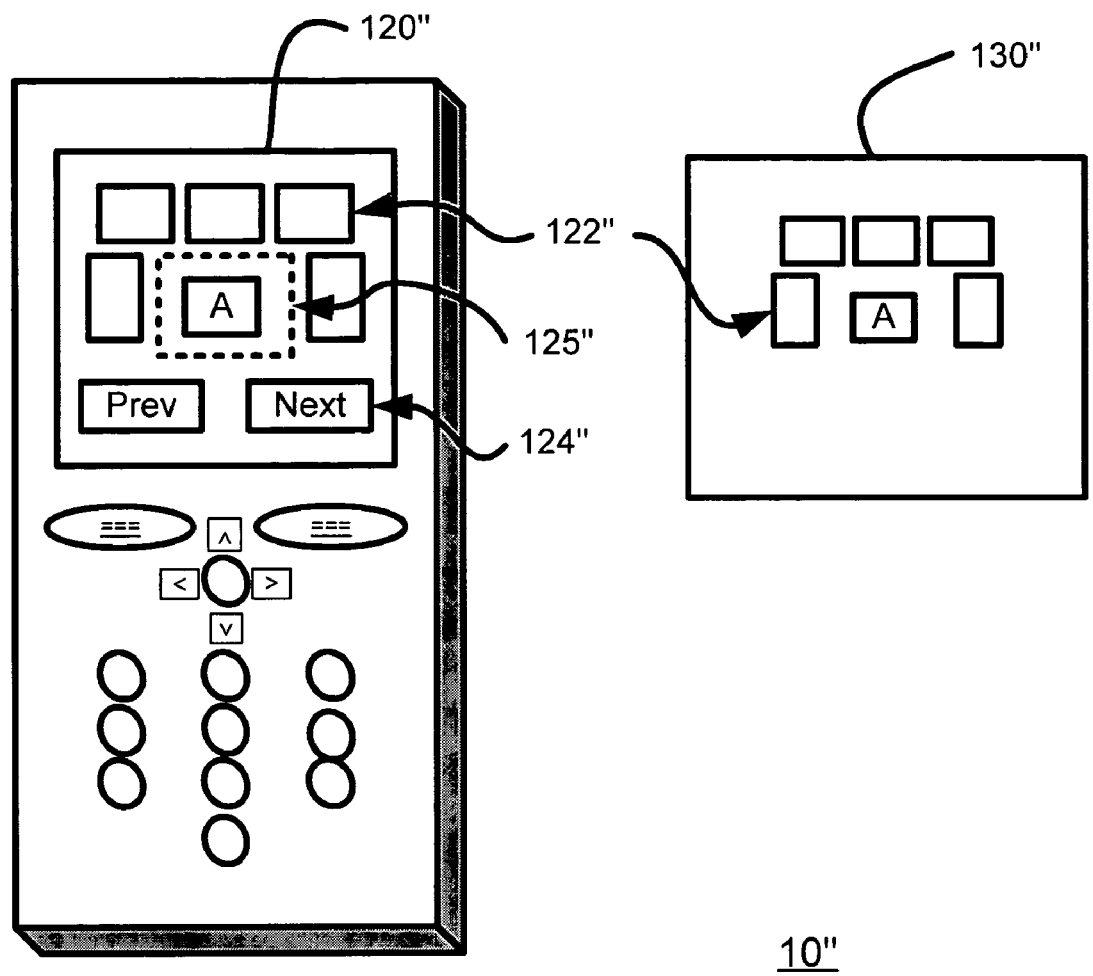
FIG. 5B illustrates the resulting primary and secondary displays when the mirror mode and control filter are activated.

FIG. 5B illustrates the resulting primary 120" and secondary 130" display windows when the mirror mode and control filter 105 are activated. In FIG. 5B, the control filter 105 is one that filters control buttons 124" and selection windows 125". As is shown, such objects have been filtered from the secondary display window 130," which displays only the array of images 122."

Figure 6:
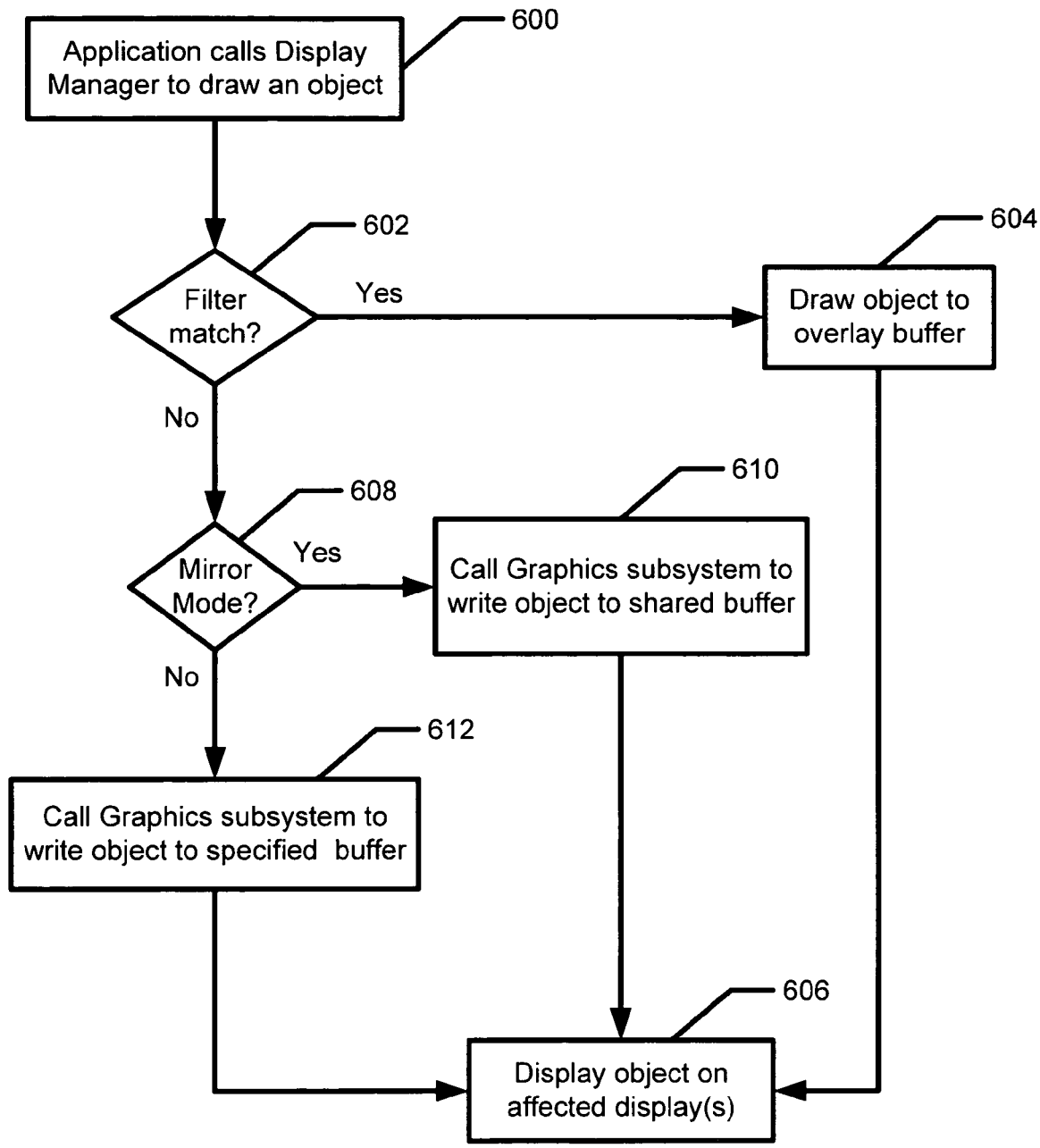
FIG. 6 is a flowchart summarizing the process for managing draw commands from an application to the display manager according to a preferred embodiment of the present invention.

FIG. 6 is a flowchart summarizing the process for managing draw commands from an application 102 to the display manager 104 according to a preferred embodiment of the present invention. Referring to FIG. 2 and FIG. 6, the process begins when the application 102 calls the display manager 104 to draw a set of objects (step 600). If activated, the control filter 105 analyzes each object in the set and determines whether the object matches the filter criteria (step 602). If the object matches, the activated filter 105 draws the object to the overlay buffer 112*a* associated with the affected display window 120 or 130 (step 604). The object is displayed on the affected display window(s) 120 and/or 130 when the affected display window(s) is refreshed or activated (step 606).

If the control filter 105 is not activated or if the object does not match any activated control filters 105, the display manager 104 determines whether the mirror mode has been activated (step 608). If the mirror mode is set, the display manager 104 calls the graphics subsystem to draw the object or set of objects to the display buffer, e.g., 110*a*, shared by the primary 120 and secondary 130 display windows (step 610). The set of objects is displayed on both display windows when they are refreshed (step 606).

Finally, if the mirror mode is not set, i.e., the mirror mode has been de-activated or simply not activated, the display manager 104 calls the graphics subsystem to draw the object or set of objects to the display buffer(s) 110*a*, 110*b* associated with the display(s) specified by the application 102 (step 612). The object or set of objects is displayed on the specified display window(s) (120 and/or 130) when the specified display window(s) is refreshed or activated (step 606).

According to aspects of the present invention, at least two display mechanisms are supported independently in a handheld electronic device. In one embodiment, a primary display window displays content for a user of the device, while one or more secondary display windows display content for an audience. According to the preferred embodiment, the primary and secondary display windows can display the same content (i.e., mirror mode activated), completely different content (i.e., mirror mode de-activated), or a common set of content with different content (i.e., filter activated). By supporting independent primary and secondary display windows, the handheld electronic device provides greater flexibility and functionality for the user as well as for viewers.

A method and system for providing a handheld electronic device that supports multiple display mechanisms independently has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A handheld electronic device comprising:
a primary display window;
a secondary display window;
a display manager coupled to the primary and secondary display windows for allowing the primary display window to display a first set of objects and allowing the secondary display window to display a second set of objects independently, wherein the first set and second set of objects include at least one common object; and
a control filter for automatically analyzing an object, the control filter being preconfigured by the display manager with filter criteria for automatically associating the object with one of the primary and secondary display windows based on a type of the object.

2. The device of claim 1 further comprising:
a plurality of display buffers coupled to the primary display window and to the secondary display window for storing respective sets of objects to be displayed,
wherein the display manager associates the primary display window and the secondary display window with a display buffer of the plurality of display buffers, and the primary display window displays the set of objects stored in the buffer associated with the primary display window and the secondary display window displays the set of objects stored in the buffer associated with the secondary display window, such that in a first mode, the sets of objects displayed by the primary display window and the secondary display window are the same, and in a second mode, the sets of objects displayed by the primary display window and the secondary display window are different.

3. The device of claim 2 wherein, in the first mode, the primary display window and the secondary display window are associated with a shared display buffer and the set of objects stored in the shared buffer is displayed on both the primary and secondary display windows.

4. The device of claim 2 wherein in the second mode, the primary display window is associated with a first display buffer and the secondary display window is associated with a second display buffer.

5. The device of claim 4 wherein the first set of objects is written to the first display buffer and the second set of objects is written to the second display buffer, and the primary display window displays the first set of objects and the secondary display window displays the second set of objects.

6. The device of claim 5 wherein the first and second sets of objects are different and share at least one common object.

7. The device of claim 2 further including at least one overlay buffer.

8. The device of claim 7 wherein the control filter automatically associates an object with one of the primary and secondary display windows based on a type of the object by writing an object matching the filter criteria to the at least one overlay buffer associated with the associated one of the primary and secondary display windows.

9. The device of claim 7 wherein the at least one overlay buffer is distinct from the at least one display buffer.

10. The device of claim 1, wherein the primary display window is a control window for a user of the device and the secondary display window is a presentation window for an audience.

11. A method for independently supporting at least two display mechanisms in a handheld electronic device comprising:
automatically analyzing an object for display to determine a type of the object;
automatically applying preconfigured filter criteria to determine whether the determined type of the object is for display with a first set of objects or for display with a second set of objects;
allowing a first display mechanism to display the first set of objects; and
allowing at least one second display mechanism to display the second set of objects independently from the first display mechanism, wherein the first set and second set of objects include at least one common object and an object is automatically associated with one of the primary and secondary display mechanisms based on a type of the object.

12. The method of claim 11 further comprising:
providing a plurality of buffers in the handheld electronic device, wherein the plurality of buffers includes a plurality of display buffers;
associating each of the at least two display mechanisms with at least one of the plurality of display buffers;
writing a set of objects to be displayed to at least one specified display buffer of the at least one display buffers; and
displaying the set of objects on at least one display mechanism associated with the at least one specified display buffer,
wherein because the set of objects is displayed only on display mechanisms associated with the at least one specified display buffer, content displayed on the at least two display mechanisms can be the same or different.

13. The method of claim 12 wherein associating each of the at least two display mechanisms with at least one of the plurality of display buffers further includes associating each display mechanism with one of the plurality of display buffers, wherein the one display buffer is shared by each display mechanism and the object is displayed on each display mechanism.

14. The method of claim 12 wherein associating each of the at least two display mechanisms with at least one of the plurality of display buffers further includes:
associating a first display mechanism with a first display buffer of the plurality of display buffers; and
associating a second display mechanism with a second display buffer of the plurality of display buffers.

15. The method of claim 14 wherein writing a set of objects to be displayed to at least one specified display buffer of the at least one display buffers further includes:
writing a first set of objects to the first display buffer; and
writing a second set of objects to the second display buffer,
wherein the first display mechanism displays the first set of objects in the associated first display buffer and the second display mechanism displays the second set of objects in the associated second display buffer.

16. The method of claim 15 wherein the first and second sets of objects are different and share at least one common object.

17. The method of claim 12 wherein providing a plurality of buffers in the handheld electronic device includes designating at least one buffer of the plurality of buffers as an overlay buffer.

18. The method of claim 17 further including:
providing at least one filter in the handheld device, wherein the at least
one filter is associated with a filter criteria that defines at least one object and at least one affected display mechanism;
associating the at least one overlay buffer with the at least one affected display mechanism; and
utilizing the at least one filter to write an object matching the filter criteria to the at least one overlay buffer, wherein the object matching the filter criteria is displayed on the at least one affected display mechanism associated with the at least one overlay buffer.

19. The method of claim 18 wherein providing at least one filter in the handheld device includes pre-configuring the filter criteria by the handheld electronic device.

20. The method of claim 17 wherein the at least one overlay buffer is distinct from the at least one display buffer.

21. The method of claim 18 wherein providing at least one filter in the handheld device includes pre-configuring the filter criteria by a user of the handheld electronic device.

22. A computer readable medium containing program instructions for independently supporting at least two display mechanisms in a handheld electronic device, the program instructions comprising:
automatically analyzing an object for display to determine a type of the object;
automatically applying preconfigured filter criteria to determine whether the determined type of the object is for display with a first set of objects or for display with a second set of objects;
allowing a first display mechanism to display the first set of objects; and
allowing at least one second display mechanism to display the second set of objects independently from the first display mechanism, wherein the first set and second set of objects include at least one common object and an object is automatically associated with one of the primary and secondary display mechanisms based on a type of the object.

23. The computer readable medium of claim 22 further comprising:
providing a plurality of buffers in the handheld electronic device, wherein the plurality of buffers includes a plurality of display buffers;
associating each of the at least two display mechanisms with at least one of the plurality of display buffers;
writing a set of n objects to be displayed to at least one specified display buffer of the at least one display buffers; and
displaying the set of objects on at least one display mechanism associated with the at least one specified display buffer,
wherein because the set of objects is displayed only on display mechanisms associated with the at least one specified display buffer, content displayed on the at least two display mechanisms can be the same or different.

24. The computer readable medium of claim 23 wherein associating each of the at least two display mechanisms with at least one of the plurality of display buffers includes associating each display mechanism with one of the plurality of display buffers, wherein the one display buffer is shared by each display mechanism and the object is displayed on each display mechanism.

25. The computer readable medium of claim 23 wherein associating each of the at least two display mechanisms with at least one of the plurality of display buffers includes:
associating a first display mechanism with a first display buffer of the plurality of display buffers; and
associating a second display mechanism with a second display buffer of the plurality of display buffers.

26. The computer readable medium of claim 25 wherein writing a set of n objects to be displayed to at least one specified display buffer of the at least one display buffers includes:
writing a first set of objects to the first display buffer; and
writing a second set of objects to the second display buffer, wherein the first display mechanism displays the first set of objects in the associated first display buffer and the second display mechanism displays the second set of objects in the associated second display buffer.

27. The computer readable medium of claim 26 wherein the first and second sets of objects are different and share at least one common object.

28. The computer readable medium of claim 23 wherein providing a plurality of buffers in the handheld electronic device includes designating at least one buffer of the plurality of buffers as an overlay buffer.

29. The computer readable medium of claim 28 further including:
providing at least one filter in the handheld device, wherein the at least one filter is associated with a filter criteria that defines at least one object and at least one affected display mechanism;
associating the at least one overlay buffer with the at least one affected display mechanism; and
utilizing the at least one filter to write an object matching the filter criteria to the at least one overlay buffer, wherein the object matching the filter criteria is displayed on the at least one affected display mechanism associated with the at least one overlay buffer.

30. The computer readable medium of claim 29 wherein providing at least one filter in the handheld device includes pre-configuring the filter criteria by the handheld electronic device.

31. The computer readable medium of claim 28 wherein the at least one overlay buffer is distinct from the at least one display buffer.

32. The computer readable medium of claim 29 wherein providing at least one filter in the handheld device includes pre-configuring the filter criteria by a user of the handheld electronic device.

* * * * *